US006975877B1

(12) United States Patent (10) Patent No.: US 6,975,877 B1
Dergun et al. (45) Date of Patent: Dec. 13, 2005

(54) SYSTEM AND METHOD FOR SYNCHRONIZING CLOCK DIVIDERS IN A WIRELESS NETWORK

(75) Inventors: Alex Dergun, San Francisco, CA (US); Ian Sayers, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 777 days.

(21) Appl. No.: 09/982,591

(22) Filed: Oct. 17, 2001

(51) Int. Cl.[7] .............................................. H04B 15/00
(52) U.S. Cl. ...................... 455/502; 455/502; 455/524; 370/328; 370/350; 370/503; 375/356
(58) Field of Search ........................ 455/911, 502, 524, 455/433; 370/350, 328, 503–520; 375/354–376; 713/400–401

(56) References Cited

U.S. PATENT DOCUMENTS

| 5,448,570 | A | * | 9/1995 | Toda et al. .................. 370/337 |
| 5,473,668 | A | * | 12/1995 | Nakahara ..................... 455/465 |
| 5,519,759 | A | * | 5/1996 | Heineck et al. .......... 455/422.1 |
| 5,613,211 | A | | 3/1997 | Matsuno |
| 5,784,368 | A | | 7/1998 | Weigand et al. |
| 5,864,592 | A | * | 1/1999 | Itri .............................. 375/375 |
| 6,014,376 | A | | 1/2000 | Abreu et al. |
| 6,112,100 | A | | 8/2000 | Ossoinig et al. ............ 455/502 |
| 6,308,078 | B1 | | 10/2001 | Van De Water ............ 455/503 |
| 6,430,395 | B2 | * | 8/2002 | Arazi et al. ................. 455/41.2 |
| 6,438,117 | B1 | * | 8/2002 | Grilli et al. .................. 370/331 |
| 6,477,385 | B1 | | 11/2002 | Hara .......................... 455/502 |
| 6,480,483 | B2 | * | 11/2002 | Yahata et al. ............... 370/350 |
| 6,532,226 | B1 | | 3/2003 | Lehtinen et al. ............ 370/347 |
| 6,622,022 | B1 | * | 9/2003 | Du .............................. 455/502 |
| 6,804,527 | B2 | * | 10/2004 | Struhsaker et al. ......... 455/502 |

FOREIGN PATENT DOCUMENTS

| EP | 0732 817 A2 | 9/1996 |
| EP | 0732817 A3 | 9/1996 |
| EP | 0 904 873 A1 | 3/1999 |
| FR | 2 744 864 | 8/1997 |
| WO | WO 94/18764 | 8/1994 |

* cited by examiner

*Primary Examiner*—Lester G. Kincaid
*Assistant Examiner*—Owen Frazier
(74) *Attorney, Agent, or Firm*—Baker Botts L.L.P.

(57) ABSTRACT

A wireless network includes a plurality of base stations that provide a wireless communication capability for a plurality of mobile stations. Each base station includes a local clock unit with a clock divider that generates local clock signals from a master clock signal received from a master clock source. The base stations are partitioned into a plurality of clusters. A sync pulse is propagated to each base station of the wireless network in order to reset their respective clock dividers. resetting of the clock dividers provides synchronization of local clock signals among the base stations. The sync pulse is propagated to all bases stations within a first cluster wherein one of the base stations in the first cluster is also a member of a second cluster. The base station that is part of the first and second clusters then propagates the sync pulse to other base stations in the second cluster and so on until the sync pulse has been delivered to all base stations in the wireless network.

19 Claims, 1 Drawing Sheet

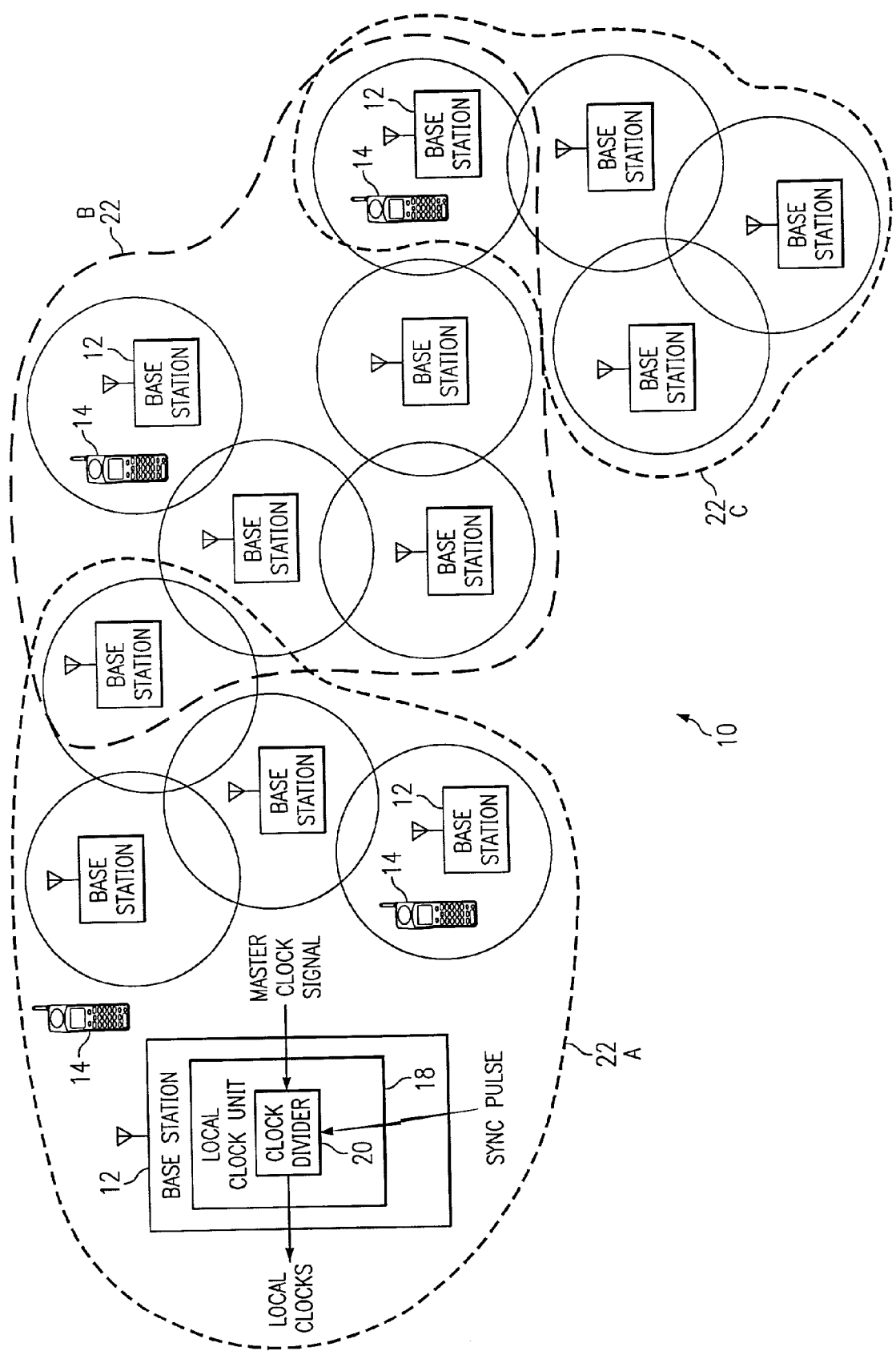

SYSTEM AND METHOD FOR SYNCHRONIZING CLOCK DIVIDERS IN A WIRELESS NETWORK

TECHNICAL FIELD OF THE INVENTION

The present invention relates in general to wireless network technology and more particularly to a system and method for synchronizing clock dividers in a wireless network.

BACKGROUND OF THE INVENTION

In Global System for Mobile Communications (GSM) wireless networks, controllers in the Mobile Switching Center (MSC) coordinate the handover (sometimes referred to as handoff) of mobile users upon traveling from one cell or base station of the network to another cell of the network. Handover may also be performed to relieve the load on a particular base station. The handover is a communication transfer for a particular mobile user from one base station to another base station. There may be a transfer period during which the uplink and downlink communications to the mobile user are severed with the base station of the first cell and not yet established at the base station of the second cell.

In order to optimize the performance of the handoff and reduce the possible break in the link, it is important to maintain frequency accuracy and, if possible, maintain network wide synchronization at base transceiver stations in a wireless network. Previously network wide synchronization of base transceiver stations had been achieved by using free running very accurate crystal oscillators or timing operations that determine and compensate for distances between base station controllers and base transceiver stations at a base station. Free running oscillators present maintenance and stability issues, require the same equipment vendor for the base station controller and base transceiver stations, and require base transceiver stations to be associated with a single base station controller. Timing operations to compensate for distance are complex and expensive.

In public wireless networks, base stations may be equipped with Global Positioning System (GPS) receivers to provide a frequency and timing reference. The use of GPS receivers does not solve the problem since it is not always possible to receive the required radio signals from a GPS satellite or retransmitted signal, especially for private wireless systems that are indoors. Moreover, the cost of these GPS receivers is justified in public wireless networks where a large number of calls are supported and the cost of the base station is very high. Private wireless networks may handle only a small number of calls and need to be much more cost effective, thus making a GPS receiver cost prohibitive. Even when a synchronized clock is provided to each base station, internal clock signals in each base station derived from the synchronized clock must also be synchronized so that time differences between internal clocks of different base stations is not too great to hinder providing a synchronized handoff. Therefore, it is desirable to provide effective handoff synchronization, especially for private wireless networks. In addition by synchronizing the base station radio interfaces it is possible to improve the voice quality of the network.

SUMMARY OF THE INVENTION

From the foregoing, it may be appreciated by those skilled in the art that a need has arisen for providing synchronization down to the internal signals of base stations in a wireless network. In accordance with the present invention, a system and method for synchronizing clock dividers in a wireless network is provided that substantially eliminates or greatly reduces disadvantages and problems associated with conventional wireless network synchronization techniques.

According to an embodiment of the present invention, there is provided a system for synchronizing clock dividers in a wireless network that includes a first plurality of wireless base stations formed into a first cluster and a second plurality of wireless base stations formed into a second cluster. At least one first wireless base station in the first cluster has a wireless communication link to at least one first wireless base station in the second cluster. The first wireless base station in the first cluster transmits a synchronization signal to other wireless base stations in the first cluster and to the first wireless base station in the second cluster. The first wireless base station in the second cluster transmits the synchronization signal to other wireless base stations in the second cluster. All of the wireless base stations can reset their internal clock dividers in response to the synchronization signal.

The present invention provides various technical advantages over conventional wireless network synchronization techniques. For example, one technical advantage is to provide synchronization of clock dividers throughout a wireless network. Another technical advantage is to effectively distribute synchronization signals to base stations in a wireless network that cannot communicate with one another over a radio interface. Yet another technical advantage is to eliminate external source synchronization techniques and have the wireless network synchronize itself. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a simplified block diagram of cellular network.

DETAILED DESCRIPTION OF THE INVENTION

FIG. 1 shows a simplified block diagram of a wireless network 10. Wireless network 10 includes a plurality of base stations 12 that provide conventional wireless communications capability with a plurality of mobile stations 14.

In order to maintain effective communications capability for a particular mobile station 14, base stations 12 are coordinated to pass control of the mobile station 14 communications among themselves as necessary so that no break in the communication path is experienced by mobile station 14. This passing of communication control among base stations 12, typically referred to as handoff, occurs as a result of movement of the mobile station 14 from the area of one base station 12 to the area of another base station 12. Handoff may also occur when the signal quality of the communication degrades at the serving base station 12 and another base station 12 has a less degraded communication capability.

To provide an efficient handoff capability, base stations 12 are synchronized among each other so that the handoff is not discernable by mobile station 14. An example of providing synchronization among base stations in a wireless network is shown in copending U.S. application Ser. No. 09/310,566 entitled "Synchronizing Clock Signals In Wireless Networks" which is hereby incorporated by reference herein.

The synchronization described in the incorporated application provides for each base station 12 to be synchronized to a master clock signal, for example 10 MHz or 13 MHz, provided by a master clock source such as from a global positioning system. From that master clock signal, each base station 12 then derives local clock signals for internal base station operation. An effective handoff also requires synchronization of local clock signals among the base stations 12.

Local clock signals at base stations 12 include frame and burst clocks derived from the master clock signal. To provide synchronized handoff in a GSM system, the time difference between the pulses of the frame and burst clocks from different base stations 12 is preferably not more than 900 nanoseconds. Drift from the master clock signal within each base station 12 may lead to time differences that exceed this desired 900 nanosecond threshold, resulting in degradation of seamless handoff capabilities. To solve this problem, the present invention contemplates the transmission of a synchronizing pulse propagated throughout base stations 12 in wireless network 10 to provide a synchronization capability at the frame and burst clock level.

Each base station 12 includes a local clock unit 18 having a clock divider 20 to derive the frame and burst clocks from a received master clock signal. Clock divider 20 is able to reset itself upon receipt of a sync pulse. The resetting of clock divider 20 provides a level of synchronization within base station 12 separate and apart from the synchronization provided by the master clock signal.

Wireless network 10 is partitioned into a plurality of partially overlapping clusters 22 to enable propagation of the sync pulse. The sync pulse is preferably transmitted among base stations 12 using the wireless interface. Base stations 12 within cluster A can communicate with each other over the radio interface. Base stations 12, which belong to two adjacent clusters A and B where clusters overlap, can be used to propagate the sync pulse from one cluster to another. In this manner, clock dividers 20 from different base stations 12 can provide synchronization of frame and burst clocks within one period of the master clock signal. For a master clock signal of 13 MHz, the synchronization of frame and burst clocks between different base stations 12 can be within 70 nanoseconds, well within the desired 900 nanosecond error threshold.

Propagation of the sync pulse may be initiated by any base station 12 within wireless network 10 or by a designated base station 12 in a particular cluster 22. Base stations 12 may be part of a public wireless network, private wireless network, or within both types of networks. Since the sync pulse is being propagated over the radio interface used by mobile stations 14 for communications, it is contemplated that sync pulse propagation be performed at a low usage time of day in the late night or early morning hours so as not to impact usage of wireless network 10 by mobile stations 14. It is also contemplated that the sync pulse be propagated on a once per day basis, although propagation may be performed on demand, non-periodically, or with more frequent or less frequent periodicity.

Thus, it is apparent that there has been provided, in accordance with the present invention, a system and method for synchronizing clock dividers in a wireless network that satisfy the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for synchronizing clock dividers in a wireless network, comprising:
    a first plurality of wireless base stations formed into a first cluster;
    a second plurality of wireless base stations formed into a second cluster;
    wherein at least a first wireless base station in the first cluster has a wireless communication link to a first wireless base station in the second cluster, and wherein the first wireless base station in the first and second clusters each include a local clock unit having an internal clock divider that is operable to derive frame and burst clocks from a received master clock signal;
    wherein the first wireless base station in the first cluster is operable to transmit a synchronization pulse to other wireless base stations in the first cluster and to the first wireless base station in the second cluster;
    wherein the first wireless base station in the second cluster is operable to transmit the synchronization pulse to other wireless base stations in the second cluster;
    wherein the first wireless base stations are operable to reset the internal clock dividers in response to the synchronization pulse in order to achieve a level of synchronization separate from the synchronization provided by the master clock signal.

2. The system of claim 1, wherein the first wireless base station of the first cluster also lies in the second cluster.

3. The system of claim 1, wherein the synchronization pulse is propagated to all wireless base stations over a wireless transmission link.

4. The system of claim 3, wherein the propagation of the synchronization pulse occurs over a same wireless transmission link as used by all base stations to communicate with mobile stations.

5. The system of claim 3, wherein the propagation of the synchronization pulse occurs over the wired link used to connect the base stations to the network.

6. The system of claim 4, wherein the synchronization pulse is transmitted during a mobile station low usage period.

7. The system of claim 1, wherein the synchronization pulse is transmitted on a periodic basis.

8. The system of claim 1, wherein the synchronization pulse is transmitted on a non-periodic basis.

9. The system of claim 1, wherein the internal clock dividers are operable to generate local signals for use by corresponding base stations in response to receipt of the master clock signal.

10. The system of claim 9, wherein the synchronization pulse is operable to provide synchronization of local signals among all of the wireless base stations.

11. The system of claim 10, wherein the local signals between all of the wireless base stations are synchronized to within one period of the master clock signal.

12. A method for synchronizing clock dividers in a wireless network, comprising:
    grouping a first plurality of wireless base stations into a first cluster;
    grouping a second plurality of base stations into a second cluster;

transmitting a synchronization pulse to each of the first plurality of wireless base stations in the first cluster, wherein at least a first wireless base station in the first cluster has a wireless communication link to a first wireless base station in the second cluster, and wherein the first wireless base station in the first and second clusters each include a local clock unit having an internal clock divider that is operable to derive frame and burst clocks from a received master clock signal;

wherein the first wireless base station in the first cluster is operable to transmit a synchronization pulse to other wireless base stations in the first cluster and to the first wireless base station in the second cluster;

wherein the first wireless base station in the second cluster is operable to transmit the synchronization pulse to other wireless base stations in the second cluster;

transmitting the synchronization pulse to the second plurality of wireless base stations in the second cluster;

resetting the internal clock dividers in each wireless base station in response to the synchronization pulse in order to achieve a level of synchronization separate from the synchronization provided by the master clock signal.

13. The method of claim 12, wherein the synchronization pulse is transmitted over a same wireless interface used for communications by mobile stations.

14. The method of claim 12, wherein the synchronization signal is transmitted periodically from a particular one of the first plurality of wireless base stations in the first cluster.

15. The method of claim 12, wherein the synchronization pulse is transmitted on a non-periodic basis.

16. A wireless base station for use in a wireless network, comprising:

a local clock unit having a clock divider, the clock divider operable to receive a master clock signal, the clock divider operable to generate local signals in response to the master clock signal and to derive frame and burst clocks from the master clock signal;

wherein the wireless base station is a first wireless base station in a first cluster of a plurality of wireless base stations having a wireless communication link to a first wireless base station in a second cluster of a plurality of wireless base stations, and wherein the first wireless base station in the first and second clusters each include the local clock unit having the internal clock divider that is operable to derive frame and burst clocks from the received master clock signal; and a wireless interface operable to receive a synchronization pulse, the clock divider operable to reset in response to the synchronization pulse so that the local signals can be synchronized with local signals from other base stations in order to achieve a level of synchronization separate from the synchronization provided by the master clock signal.

17. The base station of claim 16, wherein the wireless interface is operable to transmit the synchronization pulse to one or more other base stations.

18. The base station of claim 16, wherein the wireless interface provides communications for one or more mobile stations.

19. The base station of claim 16, wherein the local signals are synchronized to within one period of the master clock signal.

* * * * *